United States Patent
Ma

(10) Patent No.: US 9,910,584 B2
(45) Date of Patent: Mar. 6, 2018

(54) METHOD FOR MANIPULATING FOLDERS AND APPARATUS THEREOF

(71) Applicant: Lenovo (Beijing) Limited, Beijing (CN)

(72) Inventor: Chen Ma, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 257 days.

(21) Appl. No.: 14/230,472

(22) Filed: Mar. 31, 2014

(65) Prior Publication Data

US 2015/0074576 A1   Mar. 12, 2015

(30) Foreign Application Priority Data

Sep. 9, 2013   (CN) .......................... 2013 1 0407390

(51) Int. Cl.
*G06F 3/048*     (2013.01)
*G06F 3/0486*    (2013.01)
*G06F 3/0481*    (2013.01)

(52) U.S. Cl.
CPC ........ *G06F 3/0486* (2013.01); *G06F 3/04817* (2013.01); *G06F 2203/04806* (2013.01)

(58) Field of Classification Search
CPC ..... G06F 3/0486; G06F 3/0484; G06F 3/0482
See application file for complete search history.

(56) References Cited

U.S. PATENT DOCUMENTS

| 2006/0156228 | A1* | 7/2006 | Gallo | G06F 3/0481 715/202 |
| 2010/0295789 | A1* | 11/2010 | Shin | G06F 1/1626 345/168 |
| 2011/0283208 | A1* | 11/2011 | Gallo | G06F 9/4443 715/764 |
| 2012/0071208 | A1* | 3/2012 | Lee | H04M 1/72544 455/566 |

(Continued)

FOREIGN PATENT DOCUMENTS

| CN | 101408828 A | 4/2009 |
| CN | 102033710 A | 4/2011 |

OTHER PUBLICATIONS

First Office Action from Chinese Patent Application No. 201310407390.X, dated Apr. 1, 2017, 8 pages.

*Primary Examiner* — Patrick F Riegler
(74) *Attorney, Agent, or Firm* — Westman, Champlin & Koehler, P.A.

(57) ABSTRACT

The present disclosure discloses an information processing method for enhancing a display effect of an electronic device. The method includes: displaying a first part of the display interface in a display area, the first part of the display interface including a first part of the background image and P icons and Q folders located on the first part of the background image; obtaining a first manipulation operation on a first folder of the Q folders, a first sub-area of the display interface containing the first folder occupying a first display area of the display area on the display unit; executing a zoom-in instruction according to a predetermined scale in (Continued)

response to the first manipulation operation; displaying the first sub-area in a second display area of the display area when the zoom-in instruction executed is ended.

17 Claims, 8 Drawing Sheets

(56) References Cited

U.S. PATENT DOCUMENTS

| | | | | |
|---|---|---|---|---|
| 2013/0169556 A1* | 7/2013 | Kim | ................... | G06F 3/04883 345/173 |
| 2014/0019910 A1* | 1/2014 | Kim | ................... | G06F 3/04817 715/810 |
| 2014/0165006 A1* | 6/2014 | Chaudhri | ............ | G06F 3/04817 715/835 |
| 2014/0359525 A1* | 12/2014 | Weiner | ................ | G06F 3/04815 715/782 |

* cited by examiner

METHOD FOR MANIPULATING FOLDERS AND APPARATUS THEREOF

CROSS-REFERENCE TO RELATED APPLICATION

This Application is a non-provisional Application of Chinese Application Nos. CN 201310407390.X, filed Sep. 9, 2013, in Chinese, the contents of which is hereby incorporated by reference in its entirety.

TECHNICAL FIELD

The present disclosure relates to a field of computing techniques, and particularly, to information processing methods and electronic devices.

BACKGROUND

With rapid development of science and technology and increasing fierceness of market competition, performance and appearance of the electronic device have been greatly improved. The electronic device such as a smart phone, a tablet computer is becoming popular to more and more people due to its small, lightweight, full-featured, entertainment and other advantages, and has become necessary in people's work and life. A user may use the electronic device for doing more and more things. For example, the user may have a voice communication, share music or video, watch movies, play games etc. by the smart phone or the tablet computer with communication function.

Currently, there are a plurality of application icons in a display interface of the electronic device. Generally, people may place more application icons in a folder form. As such, when some application program needs to be used, a corresponding application icon may be obtained from a folder in which the corresponding application icon is placed.

When the user wants to operate on some application icon, he needs to look for the application icon in one or more folders. Here, the user needs to open the folder in which the application icon is placed, and operates on the application icon in the folder. Therefore, there are many hierarchy relationships between the display interface in the electronic device and the folders. Thus, the whole display interface appears complicated and un-concise, showing more confusion and a poor display effect, and also operation steps of the user are increased, which causes user experience not very well.

SUMMARY OF INVENTION

Embodiments of the present disclosure provide information processing methods and electronic devices, for solving technical problem of a poor display effect in the electronic device.

In an aspect of the present disclosure, an information processing method is provided. The method is applied to an electronic device, the electronic device including a display unit and a sensing unit and having a display interface in which a background image and M icons and N folders located on the background image are included, the method including:

displaying a first part of the display interface in a display area on the display unit, the first part of the display interface including a first part of the background image and P icons and Q folders located on the first part of the background image, where $P \geq 0$, $Q \geq 1$;

obtaining, by the sensing unit, a first manipulation operation on a first folder of the Q folders, a first sub-area of the display interface containing the first folder occupying a first display area of the display area on the display unit;

executing a zoom-in instruction on the first part of the display interface according to a predetermined scale based on the location of the first folder, in response to the first manipulation operation;

displaying the first sub-area of the display interface in a second display area of the display area on the display unit, when the zoom-in instruction executed on the first part of the display interface is ended, wherein the second display area is larger than the first display area, and wherein a display effect of the first sub-area being located on the second display area is a zoom-in effect of the first sub-area being located on the first display area.

Preferably, the first folder includes K icons, and the method further includes: enabling an invoking function of the K icons when the first folder is displayed in the second display area of the display area on the display unit, so that each of the K icons can enable a corresponding application in response to a trigger operation.

Preferably, determining that the zoom-in instruction executed on the first part of the display interface is ended includes:

judging whether an execution result of the zoom-in instruction satisfies a predetermined condition;

ending the zoom-in instruction executed on the display interface, when the execution result satisfies the predetermined condition.

Preferably, judging whether an execution result of the zoom-in instruction satisfies a predetermined condition particularly includes:

determining whether a size of L icon logos is identical with that of the M icons of the display interface before the zoom-in instruction is executed on the display interface; wherein it is determined that the execution result satisfies the predetermined condition, when the size of the L icon logos is identical with that of the M icons of the display interface before the zoom-in instruction is executed on the display interface; or determining whether a size of the first sub-area including the first folder on the display interface and a size of the display area satisfy a predetermined sub-condition; wherein it is determined that the execution result satisfies the predetermined condition, when the size of the first sub-area including the first folder on the display interface and the size of the display area satisfy the predetermined sub-condition.

Preferably, when the zoom-in instruction executed on the first part of the display interface is ended, the method further includes:

obtaining, by the sensing unit, a second manipulation operation on the first folder displayed in the second display area;

executing a zoom-out instruction on the first part of the display interface according to the predetermined scale based on the location of the first folder, in response to the second manipulation operation;

displaying the first sub-area of the display interface in a third display area of the display area on the display unit, when the zoom-out instruction executed on the first part of the display interface is ended, wherein the third display area is smaller than the second display area, and wherein a display effect of the first sub-area being located on the third display area is a zoom-out effect of the first sub-area being located on the second display area.

Preferably, the second manipulation operation is particularly an operation of dragging a first icon, in the first sub-area, of the K icons out of the first sub-area.

Preferably, dragging the first icon out of the first sub-area particularly includes:

generating an area frame in the first sub-area, when it is determined by the sensing unit that there is the second manipulation operation on the first folder in the first sub-area, wherein the K icons are located in the area frame;

zooming out the first part of the display interface according to the predetermined scale and keeping the size of the first icon, when the first icon is dragged;

displaying the first sub-area of the first display interface in the third display area of the display area on the display unit when the first icon is dragged out of the area frame, the first icon being located out of the first folder.

Preferably, when the zoom-out instruction executed on the first part of the display interface is ended, the method further includes: disabling the invoking function of the K icons, so that each of the K icons cannot enable a corresponding application in response to a trigger operation; wherein an icon of the first folder is consisted of L icon logos, the L icon logos are L icons with a zoom-out effect, where L≤K.

Preferably, the electronic device including a display unit and a sensing unit; the electronic device having a display interface, in which a background image and M icons and N folders located on the background image are included, the method including:

displaying a first part of the display interface in a display area on the display unit, the first part of the display interface including a first part of the background image and P icons and Q folders located on the first part of the background image, where P≥0, Q≥1;

obtaining, by the sensing unit, a first manipulation operation on a first folder of the Q folders, a first sub-area of the display interface containing the first folder occupying a first display area of the display area on the display unit;

responding to the first manipulation operation;

displaying the first sub-area of the display interface in a second display area of the display area on the display unit, wherein the second display area is larger than the first display area, and wherein a display effect of the first sub-area being located on the second display area is a zoom-in effect of the first sub-area being located on the first display area.

Preferably, the method further includes:

obtaining, by the sensing unit, a second manipulation operation on the first folder displayed in the second display area;

responding to the second manipulation operation;

displaying the first sub-area of the display interface in a third display area of the display area on the display unit; wherein the third display area is smaller than the second display area, and wherein a display effect of the first sub-area being located on the third display area is a zoom-out effect of the first sub-area being located on the second display area.

Preferably, the method further includes:

displaying a smooth zoom-in process in the display area on the display unit during the first part of the display interface is zoomed in; and/or displaying a smooth zoom-out process in the display area on the display unit during the first part of the display interface is zoomed out.

In another aspect of the present disclosure, an electronic device is provided. The electronic device includes a display unit and a sensing unit and has a display interface in which a background image and M icons and N folders located on the background image are included, the electronic device including:

a first control module configured for displaying a first part of the display interface in a display area on the display unit, the first part of the display interface including a first part of the background image and P icons and Q folders located on the first part of the background image, where P≥0, Q≥1;

a first obtaining module configured for obtaining, by the sensing unit, a first manipulation operation on a first folder of the Q folders, a first sub-area of the display interface containing the first folder occupying a first display area of the display area on the display unit;

a first responding module configured for executing a zoom-in instruction on the first part of the display interface according to a predetermined scale based on the location of the first folder, in response to the first manipulation operation;

a second control module, configured for displaying the first sub-area of the display interface in a second display area of the display area on the display unit, when the zoom-in instruction executed on the first part of the display interface is ended, wherein the second display area is larger than the first display area, and wherein a display effect of the first sub-area being located on the second display area is a zoom-in effect of the first sub-area being located on the first display area.

Preferably, the first folder includes K icons, and the electronic device further includes a second responding module, configured for enabling an invoking function of the K icons when the first folder is displayed in the second display area of the display area on the display unit, so that each of the K icons can enable a corresponding application in response to a trigger operation.

Preferably, the electronic device further includes a judging module and a third control module; and wherein the judging module judges whether an execution result of the zoom-in instruction satisfies a predetermined condition; and the third control module ends the zoom-in instruction executed on the display interface, when the execution result satisfies the predetermined condition.

Preferably, the judging module is particularly configured for:

determining whether a size of L icon logos is identical with that of the M icons of the display interface before the zoom-in instruction is executed on the display interface; wherein it is determined that the execution result satisfies the predetermined condition, when the size of the L icon logos is identical with that of the M icons of the display interface before the zoom-in instruction is executed on the display interface; or determining whether a size of the first sub-area including the first folder on the display interface and a size of the display area satisfy a predetermined sub-condition; wherein it is determined that the execution result satisfies the predetermined condition, when the size of the first sub-area including the first folder on the display interface and the size of the display area satisfy the predetermined sub-condition.

Preferably, the electronic device further includes:

a second obtaining module configured for obtaining, by the sensing unit, a second manipulation operation on the first folder displayed in the second display area;

a third responding module configured for executing a zoom-out instruction on the first part of the display interface according to the predetermined scale based on the location of the first folder, in response to the second manipulation operation;

a fourth control module configured for displaying the first sub-area of the display interface in a third display area of the display area on the display unit, when the zoom-out instruction executed on the first part of the display interface is ended, wherein the third display area is smaller than the second display area, and wherein a display effect of the first sub-area being located on the third display area is a zoom-out effect of the first sub-area being located on the second display area.

Preferably, the second manipulation operation is particularly an operation of dragging a first icon, in the first sub-area, of the K icons out of the first sub-area.

Preferably, the electronic device further includes:

a generation module configured for generating an area frame in the first sub-area, when it is determined by the sensing unit that there is the second manipulation operation on the first folder in the first sub-area, wherein the K icons are located in the area frame;

a fourth responding module configured for zooming out the first part of the display interface according to the predetermined scale and keeping the size of the first icon, when the first icon is dragged;

a fifth control module configured for displaying the first sub-area of the first display interface in the third display area of the display area on the display unit, when the first icon is dragged out of the area frame, the first icon being located out of the first folder.

Preferably, the electronic device further includes: a sixth control module configured for disabling the invoking function of the K icons, so that each of the K icons cannot enable a corresponding application in response to a trigger operation; wherein an icon of the first folder is consisted of L icon logos, the L icon logos are L icons with a zoom-out effect, where L≤K.

An electronic device, including a display unit and a sensing unit and having a display interface in which a background image and M icons and N folders located on the background image are included, the electronic device including:

a first processing module configured for displaying a first part of the display interface in a display area on the display unit, the first part of the display interface including a first part of the background image and P icons and Q folders located on the first part of the background image, where P≥0, Q≥1;

a first manipulation module configured for obtaining, by the sensing unit, a first manipulation operation on a first folder of the Q folders, a first sub-area of the display interface containing the first folder occupying a first display area of the display area on the display unit;

a first reaction module configured for responding to the first manipulation operation;

a second processing module configured for displaying the first sub-area of the display interface in a second display area of the display area on the display unit, wherein the second display area is larger than the first display area, and wherein a display effect of the first sub-area being located on the second display area is a zoom-in effect of the first sub-area being located on the first display area.

Preferably the electronic device further includes:

an obtaining module configured for obtaining, by the sensing unit, a second manipulation operation on the first folder displayed in the second display area;

a second reaction module configured for responding to the second manipulation operation;

a third processing module configured for displaying the first sub-area of the display interface in a third display area of the display area on the display unit, wherein the third display area is smaller than the second display area, and wherein a display effect of the first sub-area being located on the third display area is a zoom-out effect of the first sub-area being located on the second display area.

Preferably, a smooth zoom-in process is displayed in the display area on the display unit during the first part of the display interface is zoomed in; and/or a smooth zoom-out process is displayed in the display area on the display unit during the first part of the display interface is zoomed out.

The embodiment of the present discloses an information processing method, applied to an electronic device, the electronic device including a display unit and a sensing unit and having a display interface in which a background image and M icons and N folders located on the background image are included, the method including: displaying a first part of the display interface in a display area on the display unit, the first part of the display interface including a first part of the background image and P icons and Q folders located on the first part of the background image, where P≥0, Q≥1; obtaining, by the sensing unit, a first manipulation operation on a first folder of the Q folders, a first sub-area of the display interface containing the first folder occupying a first display area of the display area on the display unit; executing a zoom-in instruction on the first part of the display interface according to a predetermined scale based on the location of the first folder, in response to the first manipulation operation; displaying the first sub-area of the display interface in a second display area of the display area on the display unit, when the zoom-in instruction executed on the first part of the display interface is ended, wherein the second display area is larger than the first display area, and wherein a display effect of the first sub-area being located on the second display area is a zoom-in effect of the first sub-area being located on the first display area.

In the embodiment of the present disclosure, if the electronic device obtains, by the sensing unit, the first manipulation operation on the first folder in the first sub-area, the first part of the first display interface may be zoomed in according to the predetermined scale. Based on the first sub-area in which the first folder is located. For example, when the user clicks or double clicks the first folder, the electronic device may zoom in the first part based on the first sub-area in which the first folder is located. If the first folder contains an icon, a zoomed-in icon may be displayed in the display area. As such, the hierarchy relationships between the display interface and the folders are less, and thus the whole display interface appears more concise, showing a better display effect, and also operation steps of the user are decreased, which improves the user experience.

DETAILED DESCRIPTION

Figure 1:
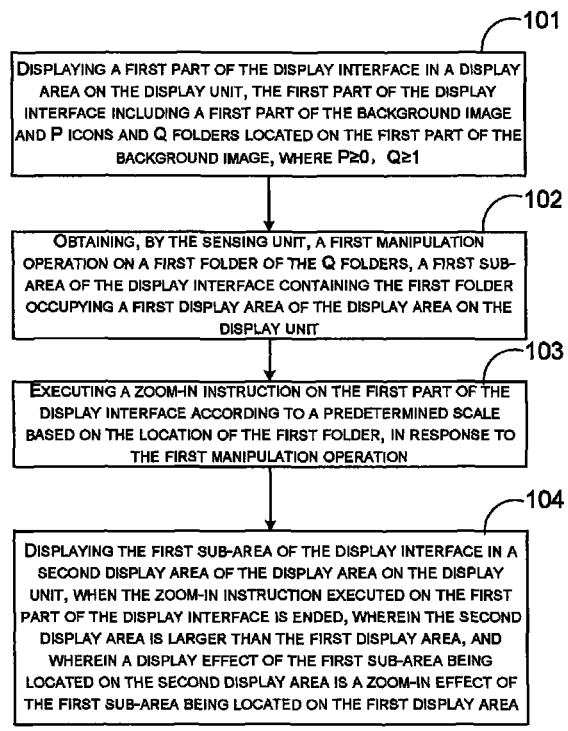
FIG. 1 shows a main flowchart of an information processing method according to an embodiment of the present disclosure.

An embodiment of the present discloses an information processing method, applied to an electronic device, the electronic device including a display unit and a sensing unit and having a display interface in which a background image and M icons and N folders located on the background image are included, the method including: displaying a first part of the display interface in a display area on the display unit, the first part of the display interface including a first part of the background image and P icons and Q folders located on the first part of the background image, where P≥0, Q≥1; obtaining, by the sensing unit, a first manipulation operation on a first folder of the Q folders, a first sub-area of the display interface containing the first folder occupying a first display area of the display area on the display unit; executing a zoom-in instruction on the first part of the display interface according to a predetermined scale based on the location of the first folder, in response to the first manipulation operation; displaying the first sub-area of the display interface in a second display area of the display area on the display unit, when the zoom-in instruction executed on the first part of the display interface is ended, wherein the second display area is larger than the first display area, and wherein a display effect of the first sub-area being located on the second display area is a zoom-in effect of the first sub-area being located on the first display area.

In the embodiment of the present disclosure, if the electronic device obtains, by the sensing unit, the first manipulation operation on the first folder in the first sub-area, the first part of the first display interface may be zoomed in according to the predetermined scale. Based on the first sub-area in which the first folder is located. For example, when the user clicks or double clicks the first folder, the electronic device may zoom in the first part based on the first sub-area in which the first folder is located. If the first folder contains an icon, a zoomed-in icon may be displayed in the display area. As such, the hierarchy relationships between the display interface and the folders are less, and thus the whole display interface appears more concise, showing a better display effect, and also operation steps of the user are decreased, which improves the user experience.

In order to clarify objects, technical solutions, advantages of the embodiments of the present disclosure, the technical solutions in the embodiments of the present disclosure will be described clearly and completely in connection with drawings in the embodiments of the present disclosure. Obviously, the embodiments described are only parts of embodiments of the present disclosure, but not all of the embodiments. Based on the embodiments in the present disclosure, all other embodiments contemplated by the skilled in the art without creative labor also belong to protection scope of the present disclosure.

In the embodiment of the present disclosure, the electronic device may be a PC (Personal Computer), a notebook, a PAD (tablet computer), a mobile phone etc. The present disclosure does not make any limitation here.

In addition, the term "and/or" here is only an association relationship, representing three relationships. For example, A and/or B may represent three cases: there is only A; there are both A and B; and there is only B. Furthermore, the symbol "/" here generally represents that the associated objects before and after "/" is in an "or" relationship.

Hereinafter, preferred embodiments of the present disclosure will be described in detail in connection with the drawings.

Embodiment One

Referring to FIG. 1, an embodiment of the present disclosure provides an information processing method applied to an electronic device. The electronic device includes a display unit and a sensing unit, and has a display interface. A background image and M icons and N folders located on the background image are included in the display interface. Main processes of the method may include:

Step 101: displaying a first part of the display interface in a display area on the display unit, the first part of the display interface including a first part of the background image and P icons and Q folders located on the first part of the background image, where P≥0, Q≥1.

In the embodiment of the present disclosure, the display interface may contain a plurality of icons and a plurality of folders, and any areas of the display interface may be observed by the display unit. For example, content in the display interface displayed in the display area may be changed by switching display pages.

In the embodiment of the present disclosure, the P icons and the Q folders may be contained in the first part, and the M icons and the N folders may be included in the display interface, wherein P may be equal to or less than M, Q may be equal to or less than N. That is, the first part displayed by the display unit may be a whole or a part of the display interface.

In the embodiment of the present disclosure, both the P icons and the Q folders in the first part of the display interface displayed in the display area may respond to operations on them.

Step 102: obtaining, by the sensing unit, a first manipulation operation on a first folder of the Q folders, a first sub-area of the display interface containing the first folder occupying a first display area of the display area on the display unit.

In the embodiment of the present disclosure, the first folder may be any of the M folders, and the first folder is located in the first sub-area of the display interface.

In the embodiment of the present disclosure, the first manipulation operation may be a click operation on the first folder, or may be a double click operation on the first folder, or may be other operations on the first folder. Preferably, the first manipulation operation may be an operation of opening the first folder.

Preferably in the embodiment of the present disclosure, if the display unit is a touch display unit, the first manipulation operation may be an operation on the first folder in the display area by an operator.

Preferably in the embodiment of the present disclosure, the operator may be e.g., a stylus pen, or the operator may be a finger of the user or other operators for input.

Preferably in the embodiment of the present disclosure, when the user performs the first manipulation operation on the first folder by the display area, the electronic device may obtain the first manipulation operation by the sensing unit.

In the embodiment of the present disclosure, the first sub-area on the display interface may contain the first folder. That is, the first sub-area is an area is occupied by the first folder in the display interface, i.e., the first folder occupying an entire first sub-area.

Preferably in the embodiment of the present disclosure, the first display area may be a part of the display area, and the first display area may have the same size as the first sub-area.

Step 103: executing a zoom-in instruction on the first part of the display interface according to a predetermined scale based on the location of the first folder, in response to the first manipulation operation.

In the embodiment of the present disclosure, the predetermined scale may be set when the electronic device is manufactured, or may be automatically set by the electronic device according to a dimension scale between an icon in the display interface and an icon in the folder or other parameters, or may be autonomously set by the user as needed.

In the embodiment of the present disclosure, after the first manipulation operation on the first folder is obtained in the first display area on the display interface, the electronic device may execute the zoom-in instruction on the first part of the display interface according to the predetermined scale based on the first folder, in response to the first manipulation operation. It may be understood that the electronic device may execute the zoom-in instruction on the first part according to the predetermined scale by centering on the first sub-area, so as to zoom in the entire first part.

In the embodiment of the present disclosure, the electronic device may zoom in the entire first part. When the electronic device executes the zoom-in instruction on the first part of the display interface according to the predetermined scale based on the first folder, a first part of the background image included in the first part and the P icons and the Q folders located on the first part of the background image are also be zoomed in according to the predetermined scale. Or, when the first part is zoomed in, the display interface and the background image and the M icons and the N folders located on the background which are contained in the display interface may all be zoomed in simultaneously.

Step 104: displaying the first sub-area of the display interface in a second display area of the display area on the display unit, when the zoom-in instruction executed on the first part of the display interface is ended, wherein the second display area is larger than the first display area, and wherein a display effect of the first sub-area being located on the second display area is a zoom-in effect of the first sub-area being located on the first display area.

In the embodiment of the present disclosure, it is to be firstly determined when the zoom-in instruction is ended, before the first sub-area of the display interface is displayed in the second display area of the display area on the display unit.

In particular, determining that the zoom-in instruction executed on the first part of the display interface is ended may includes: judging whether an execution result of the zoom-in instruction satisfies a predetermined condition; and ending the zoom-in instruction executed on the display interface, when the execution result satisfies the predetermined condition.

Preferably in the embodiment of the present disclosure, judging whether an execution result of the zoom-in instruction satisfies a predetermined condition may particularly include: determining whether a size of L icon logos is identical with that of the M icons of the display interface before the zoom-in instruction is executed on the display interface; wherein it is determined that the execution result satisfies the predetermined condition, when the size of the L icon logos is identical with that of the M icons of the display interface before the zoom-in instruction is executed on the display interface; or determining whether a size of the first sub-area including the first folder on the display interface and a size of the display area satisfy a predetermined sub-condition; wherein it is determined that the execution result satisfies the predetermined condition, when the size of the first sub-area including the first folder on the display interface and the size of the display area satisfy the predetermined sub-condition.

In the embodiment of the present disclosure, if the icon of the first folder displayed in the first display area is consisted of the L icon logos, and the display area further includes the P icons of the M icons on the background image in the display interface, the zoom-in instruction may be executed on the first part according to the predetermined scale based on the location of the first folder, after the electronic device obtains the first manipulation operation by the sensing unit. During the first part is zoomed in, it may be judged whether the execution result of the zoom-in result satisfies the predetermined condition in real time, periodically or by a trigger.

For example, it may be judged whether the size of the L icon logos constituting the icon of the first folder is identical with that of the M icons of the display interface before the zoom-in instruction is executed on the first part of the display interface. If so, it is determined that the execution result satisfies the predetermined condition, and the zoom-in instruction is ended. If not, it is determined that the execution result does not satisfy the predetermined condition, and the zoom-in instruction continues to be executed, until the size of the L icon logos is identical with that of the M icons of the display interface before the zoom-in instruction is executed on the first part of the display interface. Then, the zoom-in instruction may be ended Or, the size of the display area on the display unit may be used as a reference value, and the predetermined sub-condition may be set. For example, the predetermined sub-condition may be a difference between the size of the first sub-area and the size of the display area being within a preset range. Thus, during the first part of the display interface is zoomed in, the electronic device may determine to end the execution of the zoom-in instruction if it is determined that the difference between the size of the first sub-area and the size of the display area is within the preset range; while the electronic device may determine to continue execution of the zoom-in instruction if it is determined that the difference between the size of the first sub-area and the size of the display area is not within the preset range.

In the embodiment of the present disclosure, when the electronic device obtains the first manipulation operation on the display interface, the zoom-in instruction may be executed on the first part of the display interface according to the predetermined scale based on the first sub-area containing the first folder, and the first sub-area may be displayed in the second display area of the display area, the second display area being larger than the first display area. Thus, the display effect of the first sub-area being located on the second display area is the zoom-in effect of the first sub-area being located on the first display area, i.e., it is the zoomed-in first sub-area that is displayed in the second display area. Preferably, the size of the zoomed-in first sub-area may be equal to the size of the second display area after the first sub-area is zoomed in according to the predetermined scale.

Figure 2A:
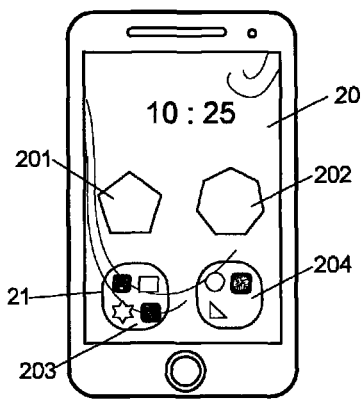
FIGS. 2A-2C show zoom-in schematic diagrams of a first part in an embodiment of the present disclosure.

For example, as shown in FIG. 2A, the first part 20 of the display interface is displayed in the display unit of the electronic device, in which the first part 20 contains a first icon 201, a second icon 202, a first folder 203 and a second folder 204, the first sub-area occupied by the first folder 203 is the first display area 21, i.e., the size of the first sub-area is identical with the size of the first display area, and the first folder occupies a whole size of the first sub-area.

Figure 2B:
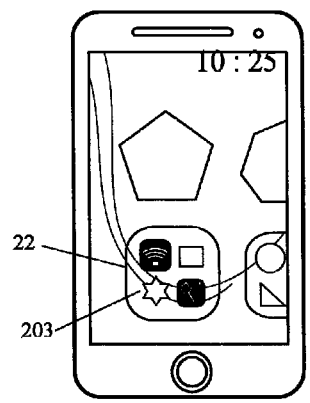

When the electronic device obtains the first manipulation operation on the first folder 203 by the sensing unit, the zoom-in instruction may be executed on the first part of the display interface according to the predetermined scale based on the location of the first folder 203, and the first sub-area 22 occupied by the first folder 203 may be displayed in the display area. Referring to FIG. 2B which shows a zoom-in process, the size of the first sub-area 22 where the first folder is located is obviously larger than that of the first sub-area in the first display area 21 as shown in FIG. 2A.

Preferably in the embodiment of the present disclosure, the first folder may include K icons. When the zoom-in instruction executed on the first part of the display interface is ended and the first folder is displayed in the second display area of the display area on the display unit, the electronic device may enable the invoking function of the K icons when the first folder is displayed in the second display area of the display area on the display unit, so that each of the K icons can enable a corresponding application in response to a trigger operation, i.e., each of the K icons may be in an operable state.

Figure 2C:
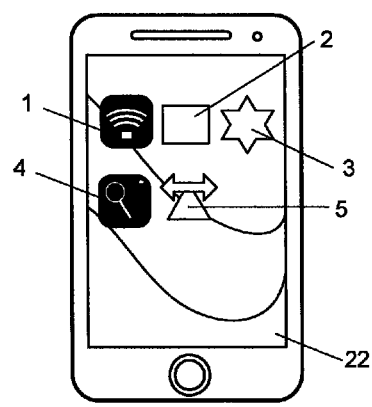

For example, referring to FIG. 2C, when the zoom-in instruction executed on the first part of the display interface is ended, the first folder displayed in the second display area 22 of the display area on the display unit may include five icons, Icon 1, Icon 2, Icon 3, Icon 4 and Icon 5. Here, the electronic device may enable the invoking function of these five icons, so that each of the five icons may be in the operable state. When the user performs a trigger operation on any of the five icons, e.g., Icon 3, the electronic device may respond to the trigger operation and invoke data corresponding to Icon 3. If the data corresponding to Icon 3 has a corresponding display window, the electronic device may also display the display window on the display unit for further operations of the user.

Preferably, when the K icons in the first folder are displayed in the second display area of the display area, both the M icons in the first part of the display interface and other folders except the first folder in the N folders are not in the display area.

For example, the size of the second display area may be identical with that of the display area. That is, the electronic device displays the first sub-area in the second display area, which is equivalent to displaying the first sub-area in a full screen. Therefore, other folders except the first folder may obviously not be included in the second display area.

Further in the embodiment of the present disclosure, when the zoom-in instruction executed on the first part of the display interface is ended, the method may further include: obtaining, by the sensing unit, a second manipulation operation on the first folder displayed in the second display area; executing a zoom-out instruction on the first part of the display interface according to the predetermined scale based on the location of the first folder, in response to the second manipulation operation; displaying the first sub-area of the display interface in a third display area of the display area on the display unit, when the zoom-out instruction executed on the first part of the display interface is ended, wherein the third display area is smaller than the second display area, and wherein a display effect of the first sub-area being located on the third display area is a zoom-out effect of the first sub-area being located on the second display area.

In the embodiment of the present disclosure, when the zoom-in instruction executed on the first part of the display interface is ended, and the first sub-area is displayed in the second display area of the display unit, the electronic device may respond to the second manipulation operation after the second manipulation operation is obtained by the sending unit, when the user performs the second manipulation operation on the first folder in the second display area. Here, the electronic device may execute the zoom-out instruction on the first part of the display interface according to the predetermined scale, based on the first sub-area in which the first folder is located. When the zoom-out instruction executed by the electronic device is ended, the first sub-area may be displayed in the third display area of the display area on the display unit, the third display area being smaller than the second display area. The display effect of the first sub-area being located on the third display area is the zoom-out effect of the first sub-area being located on the second display area, i.e., it is the first sub-area on which the zoom-in instruction has not been executed that is displayed in the third display area.

Preferably, the size of the zoomed-out first sub-area may be equal to the size of the third display area after the first sub-area is zoomed out according to the predetermined scale. Furthermore, the size of the third display area may be equal to that of the first display area.

In the embodiment of the present disclosure, the second manipulation operation may be e.g. an operation of dragging a first icon, in the first sub-area, of the K icons out of the first sub-area.

In the embodiment of the present disclosure, dragging the first icon out of the first sub-area may particularly include:
generating an area frame in the first sub-area, when it is determined by the sensing unit that there is the second manipulation operation on the first folder in the first sub-area, wherein the K icons are located in the area frame; zooming out the first part of the display interface according to the predetermined scale and keeping the size of the first icon, when the first icon is dragged; displaying the first sub-area of the first display interface in the third display area of the display area on the display unit when the first icon is dragged out of the area frame, the first icon being located out of the first folder.

Preferably in the embodiment of the present disclosure, the area frame may be an area wire frame generated by the electronic device and displayed in the second display area, when the second manipulation operation on the first icon is obtained by the second display interface, and the K icons in the first folder are all located in the area frame. The size of the area frame may be no larger than that of the second display area.

Figure 3A:
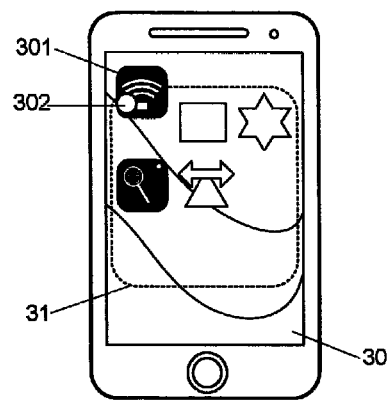
FIGS. 3A-3B show zoom-out schematic diagrams of a first part in an embodiment of the present disclosure.

When the first icon of the K icons touches or is dragged out of the area frame by the second manipulation operation, the electronic device may execute the zoom-out instruction on the first part of the display interface according to the predetermined scale based on the location of the second display area. During the electronic device executes the zoom-out instruction, the first icon may be kept as it is (i.e. the size of being zoomed-in). Referring to FIG. 3, a number 30 refers to the second display area, i.e., the first folder, a number 31 refers to the area frame; assuming that the area frame is smaller than the second display area, a number 301 refers to the first icon, a number 302 refers to existence of the second manipulation operation. As seen from FIG. 3, the first icon 301 is being dragging out of the area frame 31 by the second manipulation operation 302. It may also be seen from FIG. 3A that the electronic device has not executed the zoom-out instruction, or the electronic device is executing the zoom-out instruction.

Figure 3B:
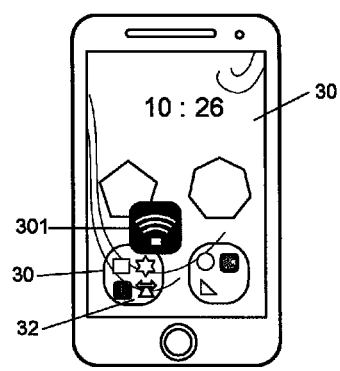

When the first folder is displayed in the third display area, the first icon has been located out of the third display area, i.e., out of the first folder, which is equivalent to being dragged out of the first folder, as shown in FIG. 3B. In FIG. 3B, the number 30 refers to the display area, the number 31 refers to the third display area, i.e., the first folder, the number 32 refers to the first icon, and the number 302 refers to the first folder.

In the embodiment of the present disclosure, when the zoom-out instruction executed is ended, the method may further include: disabling the invoking function of the K icons, so that each of the K icons cannot enable a corresponding application in response to a trigger operation; wherein an icon of the first folder is consisted of L icon logos, the L icon logos are L icons with the zoom-out effect, where L≤K.

In the embodiment of the present disclosure, when the zoom-out instruction executed on the first part of the display interface is ended, the first folder may be displayed in the third display area of the display area on the display unit. Any of the K icons in the first folder cannot enable the corresponding application in response to the trigger operation, i.e., the invoking function of the K icons is disabled.

Here, displaying the first folder in the third display area means that an icon capable of representing the first folder is displayed in the third display area. The icon of the first folder may be consisted of the L icon logos, i.e., the display effect of the first folder in the third display area may be identical with that of the first folder in the first display area, in which the L icon logos is the zoom-out effect of the L icons in the first folder, and all of the L icon logos cannot respond to operations on them.

For example, after the execution of the zoom-in instruction is ended, the first folder displayed in the second display area of the display area on the display unit include five application icons corresponding to different applications respectively, and the application icons may respond to the operations on them. However, after the second manipulation operation is obtained by the sensing unit in the second display area, and the zoom-out instruction executed on the first part of the display interface is ended, the first folder is displayed in the third display area of the display area on the display unit. Here, the invoking function of the five application icons in the first folder may all be disabled. The icon of the first folder may be consisted of four icon logos generated by zooming out four of the five application icons in the second display area according to the predetermined scale, and the icon logos cannot respond to operations on them.

Figure 4A:
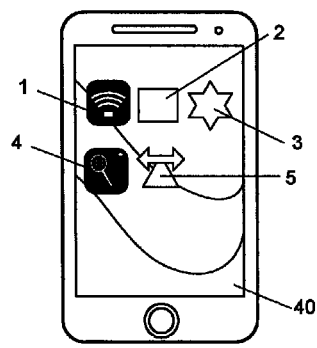
FIGS. 4A-4B shows schematic diagrams of forming an icon logo in an embodiment of the present disclosure.
Figure 4B:
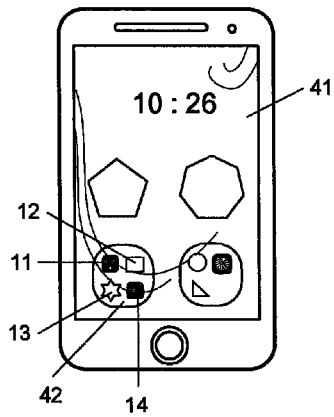

Referring to FIGS. 4A and 4B, in FIG. 4A, a number 40 refers to the second display area. It may be seen that numbers 1-5 refer to the five application icons in the first folder displayed in the second display area 40 respectively, and the display effects of the five application icons are zoom-out effects. In FIG. 4B, a number 41 refers to the display area, a number 42 refers to the first folder in the third display area, numbers 11-14 refer to the four icon logos forming a logo of the first folder respectively, and the four icon logos correspond to the application icons numbered 1-4 in FIG. 4A respectively.

Embodiment Two

Figure 5:
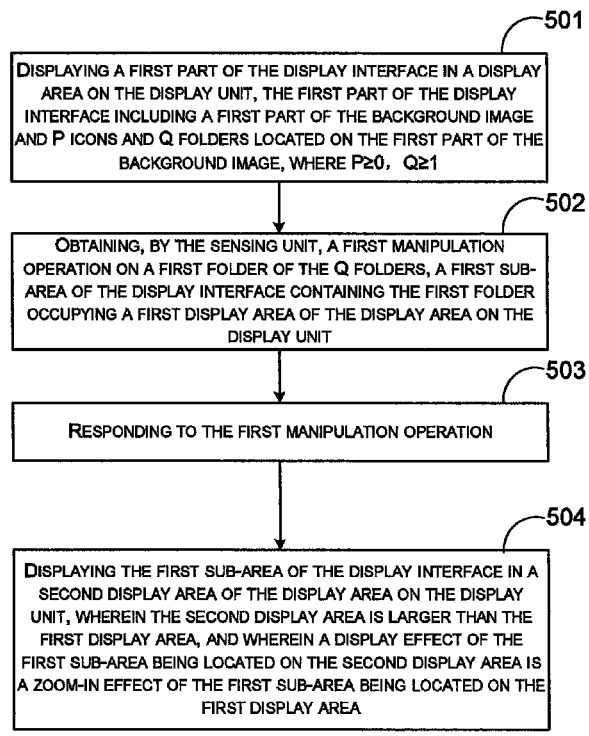
FIG. 5 shows a main flowchart of another information processing method according to an embodiment of the present disclosure.

Referring to FIG. 5, an embodiment of the present disclosure provides an information processing method applied to an electronic device, the electronic device including a display unit and a sensing unit; the electronic device having a display interface, in which a background image and M icons and N folders located on the background image are included, the method including:

Step 501: displaying a first part of the display interface in a display area on the display unit, the first part of the display interface including a first part of the background image and P icons and Q folders located on the first part of the background image, where P≥0, Q≥1.

In the embodiment of the present disclosure, the display interface may contain a plurality of icons and a plurality of folders, and any areas of the display interface may be observed by the display unit. For example, content in the display interface displayed in the display area may be changed by switching display pages.

In the embodiment of the present disclosure, the P icons and the Q folders may be contained in the first part, and the M icons and the N folders may be included in the display interface, wherein P may be equal to or less than M, Q may be equal to or less than N. That is, the first part displayed by the display unit may be a whole or a part of the display interface.

Preferably, in the embodiment of the present disclosure, the P icons and the Q folders in the first part may be displayed in the display area of the display unit in a Sudoku form, i.e., the display area may be divided into nine display sub-areas by default, in which respective display sub-areas have the same size, and each of the display sub-areas may display an icon or folder. The icon may be one of the P icons in the first part or one sub-icon of any of the Q folders, and the folder may be any of the Q folders. The P icons and the Q folders in the display area may all respond to the operations on them.

Step 502: obtaining, by the sensing unit, a first manipulation operation on a first folder of the Q folders, a first sub-area of the display interface containing the first folder occupying a first display area of the display area on the display unit.

In the embodiment of the present disclosure, the first folder may be any of the M folders, and the first folder is located in the first sub-area of the display interface.

In the embodiment of the present disclosure, the sub-area of the display interface may contain the first folder. That is, the size of the first sub-area is larger than the size occupied by the first folder.

Preferably, in the embodiment of the present disclosure, if nine display sub-areas are arranged in the display area in the Sudoku form, the first display area may be one of the display sub-areas, and the first display area may have the same size as the first sub-area.

Figure 6:
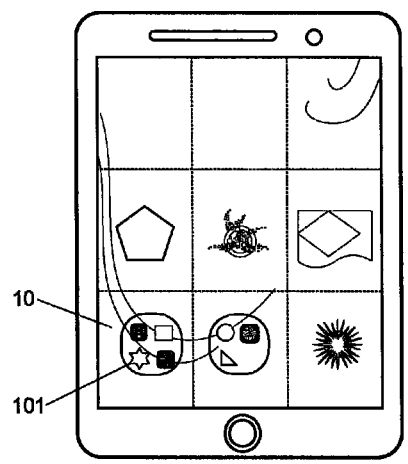
FIG. 6 shows a schematic diagram of a display area division in an embodiment of the present disclosure.

For example, referring to FIG. 6, a number 10 refers to the first display area in the display area, a number 101 refers to the first folder, and the first sub-area in which the first folder 101 is located and the first display area 10 have the same size.

In the embodiment of the present disclosure, the first manipulation operation may be a click operation on the first folder, or may be a double click operation on the first folder, or may be other operations on the first folder. Preferably, the first manipulation operation may be an operation of opening the first folder.

Preferably in the embodiment of the present disclosure, if the display unit is a touch display unit, the first manipulation operation may be an operation on the first folder in the display area by an operator.

Preferably in the embodiment of the present disclosure, the operator may be e.g., a stylus pen, or the operator may be a finger of the user or other operators for input.

Preferably in the embodiment of the present disclosure, when the user performs the first manipulation operation on the first folder by the display area, the electronic device may obtain the first manipulation operation by the sensing unit.

Step 503: responding to the first manipulation operation.

In the embodiment of the present disclosure, when the electronic device obtains the first manipulation operation on the first folder from the first display area of the display interface, the electronic device may respond to the first manipulation operation, and executes an instruction corresponding to the first manipulation operation. For example, executing the instruction corresponding to the first manipulation operation may include executing the zoom-in instruction on the first part of the display interface according to the predetermined scale based on the first sub-area containing the first folder.

Step 504: displaying the first sub-area of the display interface in a second display area of the display area on the display unit, wherein the second display area is larger than the first display area, and wherein a display effect of the first sub-area being located on the second display area is a zoom-in effect of the first sub-area being located on the first display area.

In the embodiment of the present disclosure, when the electronic device obtains the first manipulation operation on the display interface, if the electronic device may execute the zoom-in instruction on the first part of the display interface according to the predetermined scale based on the first sub-area containing the first folder, when the first sub-area may be displayed in the second display area of the display area, the second display area being larger than the first display area, the display effect of the first sub-area being located on the second display area is the zoom-in effect of the first sub-area being located on the first display area, i.e., it is the zoomed-in first sub-area that is displayed in the second display area. Preferably, the size of the zoomed-in first sub-area may be equal to the size of the second display area after the first sub-area is zoomed in according to the predetermined scale.

Figure 7A:
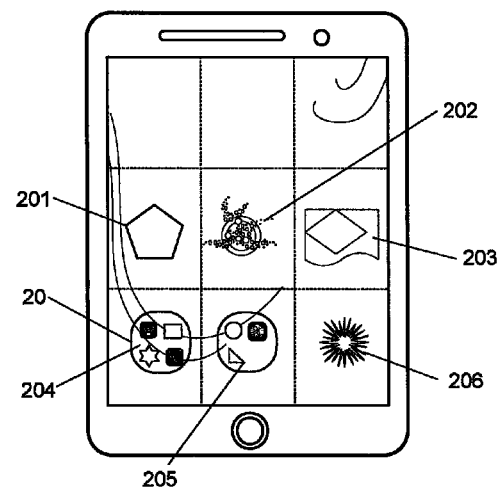
FIGS. 7A-7B show schematic diagrams of opening a first folder in an embodiment of the present disclosure.

For example, as shown in FIG. 7A, the first part of the display interface is displayed in the first display area 20 of the display area on the display unit of the electronic device, in which the first part contains a first icon 201, a second icon 202, a third icon 203, a first folder 204, a second folder 205 and a fourth icon 206. The first folder 204 is located in the first sub-area, and the first sub-area occupies a whole size of the first display area 20.

Figure 7B:
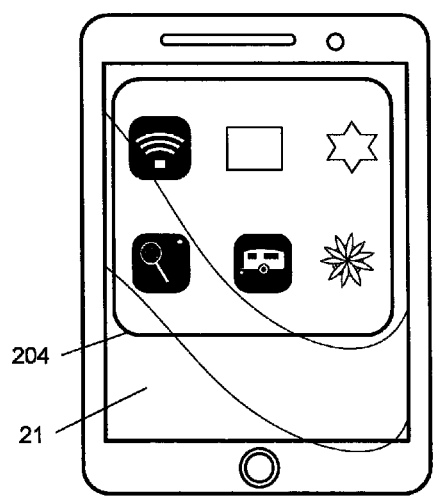

When the electronic device obtains the first manipulation operation on the first folder 204 by the sensing unit, the electronic device may respond to the first manipulation operation, and display the first sub-area occupied by the first folder 204 by the second display area 21 of the display area. Referring to FIG. 7B, the size of the second display area 21 is larger than that of the first display area 20 as shown in FIG. 7A.

Further in the embodiment of the present disclosure, after step 504, the method may further include: obtaining, by the sensing unit, a second manipulation operation on the first folder displayed in the second display area; responding to the second manipulation operation; displaying the first sub-area of the display interface in a third display area of the display area on the display unit; wherein the third display area is smaller than the second display area, and wherein a display effect of the first sub-area being located on the third display area is a zoom-out effect of the first sub-area being located on the second display area.

in the embodiment of the present disclosure, when the zoomed-in first sub-area of the display interface is displayed in the second display area of the display area on the display unit, if the electronic device obtains the second manipulation operation on the first folder from the second display area, it may respond to the second manipulation operation, and may display the first sub-area of the display interface in the third display area of the display area on the display unit, the third display area being smaller than the second display area, the display effect of the first sub-area being located on the third display area is the zoom-out effect of the first sub-area being located on the second display area, i.e., it is the first sub-area not being zoomed in yet that is displayed in the third display area.

Figure 8A:
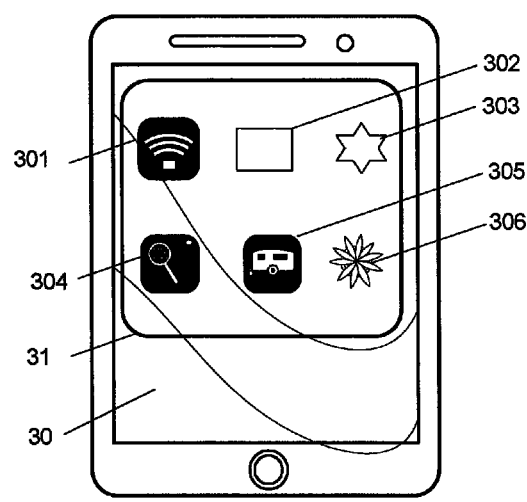
FIGS. 8A-8C show schematic diagrams of dragging a first icon out in an embodiment of the present disclosure.

For example, as shown in FIG. 8A, the first sub-area containing the first folder 31 is displayed in the second display area 30 of the display area on the display unit of the electronic device, in which the first folder 31 contains a first icon 301, a second icon 302, a third icon 303, a fourth icon 304, a fifth icon 304 and a sixth icon 306.

Figure 8B:
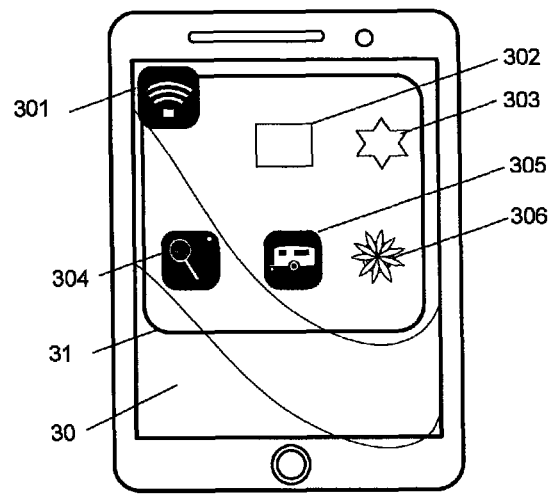

When the electronic device obtains the second manipulation operation on the first folder 31, e.g., the first icon 301 may be dragged according to the second manipulation operation, as shown in FIG. 8B.

Figure 8C:
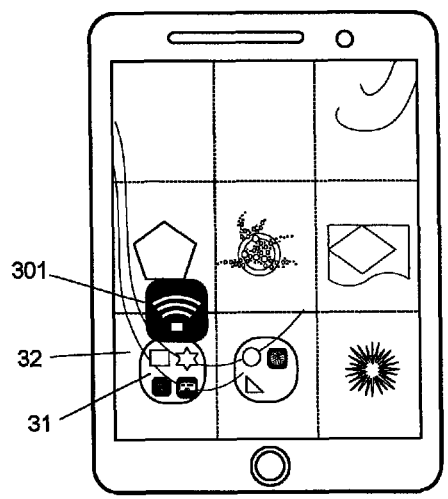

When the first icon 301 is dragged out of the scope of the first folder 31, the first sub-area is displayed in the third display area 32 of the display area on the display unit, and the third display area is smaller than the second display area, as shown in FIG. 8C.

Preferably in the embodiment of the present disclosure, a smooth zoom-in process is displayed in the display area on the display unit during the first part of the display interface is zoomed in; and/or a smooth zoom-out process is displayed in the display area on the display unit during the first part of the display interface is zoomed out.

In the embodiment of the present disclosure, the electronic device may zoom on the first part of the display interface in response to the first manipulation operation. Thus, the user may find in the display area that the zoom-in process is the smooth zoom-in process. For example, the interfaces in FIGS. 7A-7B may be the display states of the display area during the smooth zoom-in process. When the first part of the display interface is zoomed in and the electronic device obtains the second manipulation operation, the electronic device controls the first part of the display interface to be zoomed out, so as to resume the first part to the original size. Here, the user may find in the display area of the display unit that the zoom-out process is the smooth zoom-out process. For example, the interfaces in FIGS. 8A-8B may be the display states of the display area during the smooth zoom-out process.

Embodiment Three

Figure 9:
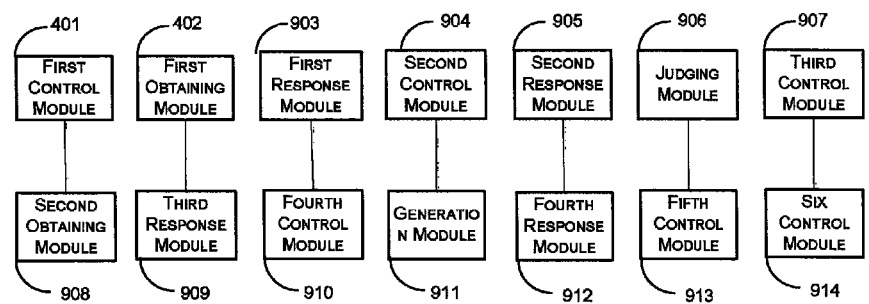
FIG. 9 shows a structure diagram of an electronic device in an embodiment of the present disclosure.

Referring to FIG. 9, an embodiment of the present invention provides an electronic device, including a display unit and a sensing unit and having a display interface in which a background image and M icons and N folders located on the background image are included. The electronic device may further include: a first control module 901, a first obtaining module 902, a first response module 903 and a second control module 904.

Preferably, the electronic device may further include: a second response module 905, a judging module 906, a third control module 907, a second obtaining module 908, a third response module 909, a fourth control module 910, a generation module 911, a fourth response module 912, a fifth control module 913, and a sixth control module 914.

The first control module 901 may be configured for displaying a first part of the display interface in a display area on the display unit, the first part of the display interface including a first part of the background image and P icons and Q folders located on the first part of the background image, where P≥0, Q≥1.

The first obtaining module 902 may be configured for obtaining, by the sensing unit, a first manipulation operation on a first folder of the Q folders, a first sub-area of the display interface containing the first folder occupying a first display area of the display area on the display unit.

The first responding module 903 may be configured for executing a zoom-in instruction on the first part of the display interface according to a predetermined scale based on the location of the first folder, in response to the first manipulation operation.

The second control module 904 may be configured for displaying the first sub-area of the display interface in a second display area of the display area on the display unit, when the zoom-in instruction executed on the first part of the display interface is ended, wherein the second display area is larger than the first display area, and wherein a display effect of the first sub-area being located on the second display area is a zoom-in effect of the first sub-area being located on the first display area.

In the embodiment of the present disclosure, the first folder includes K icons. The second responding module 905 may be configured for enabling an invoking function of the K icons when the first folder is displayed in the second display area of the display area on the display unit, so that each of the K icons can enable a corresponding application in response to a trigger operation.

The judging module 906 may be configured for judging whether an execution result of the zoom-in instruction satisfies a predetermined condition; and The third control module 907 may be configured for ending the zoom-in instruction executed on the display interface, when the execution result satisfies the predetermined condition.

The judging module 906 may be particularly configured for: determining whether a size of L icon logos is identical with that of the M icons of the display interface before the zoom-in instruction is executed on the display interface; wherein it is determined that the execution result satisfies the predetermined condition, when the size of the L icon logos is identical with that of the M icons of the display interface before the zoom-in instruction is executed on the display interface; or determining whether a size of the first sub-area including the first folder on the display interface and a size of the display area satisfy a predetermined sub-condition; wherein it is determined that the execution result satisfies the predetermined condition, when the size of the first sub-area including the first folder on the display interface and the size of the display area satisfy the predetermined sub-condition.

The second obtaining module 908 may be configured for obtaining, by the sensing unit, a second manipulation operation on the first folder displayed in the second display area.

The third responding module 909 may be configured for executing a zoom-out instruction on the first part of the display interface according to the predetermined scale based on the location of the first folder, in response to the second manipulation operation.

The fourth control module 910 may be configured for displaying the first sub-area of the display interface in a third display area of the display area on the display unit, when the zoom-out instruction executed on the first part of the display interface is ended, wherein the third display area is smaller than the second display area, and wherein a display effect of the first sub-area being located on the third display area is a zoom-out effect of the first sub-area being located on the second display area.

In the embodiment of the present disclosure, the second manipulation operation may be particularly an operation of dragging a first icon, in the first sub-area, of the K icons out of the first sub-area.

The generation module 911 may be configured for generating an area frame in the first sub-area, when it is determined by the sensing unit that there is the second manipulation operation on the first folder in the first sub-area, wherein the K icons are located in the area frame.

The fourth responding module 912 may be configured for zooming out the first part of the display interface according to the predetermined scale and keeping the size of the first icon, when the first icon is dragged.

The fifth control module 913 may be configured for displaying the first sub-area of the first display interface in the third display area of the display area on the display unit, when the first icon is dragged out of the area frame, the first icon being located out of the first folder.

The sixth control module 914 may be configured for disabling the invoking function of the K icons, so that each of the K icons cannot enable a corresponding application in response to a trigger operation; wherein an icon of the first folder is consisted of L icon logos, the L icon logos are L icons with a zoom-out effect, where L≤K.

Embodiment Four

Figure 10:
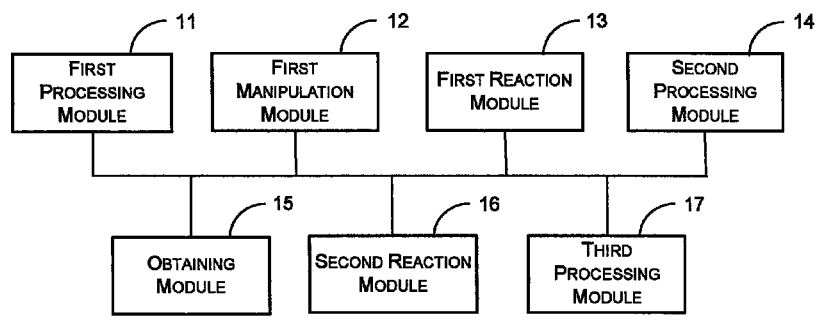
FIG. 10 shows a structure diagram of another electronic device in an embodiment of the present disclosure.

Referring to FIG. 10, an embodiment of the present invention provides an electronic device, including a display unit and a sensing unit and having a display interface in which a background image and M icons and N folders located on the background image are included. The electronic device may further include: a first processing module 11, a first manipulation module 12, a first reaction module 13 and a second processing module 14. Preferably, the electronic device in Embodiment Four and the electronic device in Embodiment Three may be the same electronic device.

Preferably, the electronic device may further include: a obtaining module 15, a second reaction module 16 and a third processing module 17.

The first processing module 11 may be configured for displaying a first part of the display interface in a display area on the display unit, the first part of the display interface including a first part of the background image and P icons and Q folders located on the first part of the background image, where P≥0, Q≥1.

The first manipulation module 12 may be configured for obtaining, by the sensing unit, a first manipulation operation on a first folder of the Q folders, a first sub-area of the display interface containing the first folder occupying a first display area of the display area on the display unit.

The first reaction module 13 may be configured for responding to the first manipulation operation;

The second processing module 14 may be configured for displaying the first sub-area of the display interface in a second display area of the display area on the display unit, wherein the second display area is larger than the first display area, and wherein a display effect of the first sub-area being located on the second display area is a zoom-in effect of the first sub-area being located on the first display area.

The obtaining module 15 may be configured for obtaining, by the sensing unit, a second manipulation operation on the first folder displayed in the second display area.

The second reaction module 16 may be configured for responding to the second manipulation operation.

The third processing module 17 may be configured for displaying the first sub-area of the display interface in a third display area of the display area on the display unit, wherein the third display area is smaller than the second display area, and wherein a display effect of the first sub-area being located on the third display area is a zoom-out effect of the first sub-area being located on the second display area.

In the embodiment of the present disclosure, a smooth zoom-in process is displayed in the display area on the display unit during the first part of the display interface is zoomed in; and/or a smooth zoom-out process is displayed in the display area on the display unit during the first part of the display interface is zoomed out.

The embodiment of the present discloses an information processing method, applied to an electronic device, the electronic device including a display unit and a sensing unit and having a display interface in which a background image and M icons and N folders located on the background image are included, the method including: displaying a first part of the display interface in a display area on the display unit, the first part of the display interface including a first part of the background image and P icons and Q folders located on the first part of the background image, where P≥0, Q≥1; obtaining, by the sensing unit, a first manipulation operation on a first folder of the Q folders, a first sub-area of the display interface containing the first folder occupying a first display area of the display area on the display unit; executing a zoom-in instruction on the first part of the display interface according to a predetermined scale based on the location of the first folder, in response to the first manipulation operation; displaying the first sub-area of the display interface in a second display area of the display area on the display unit, when the zoom-in instruction executed on the first part of the display interface is ended, wherein the second display area is larger than the first display area, and wherein a display effect of the first sub-area being located on the second display area is a zoom-in effect of the first sub-area being located on the first display area.

In the embodiment of the present disclosure, if the electronic device obtains, by the sensing unit, the first manipulation operation on the first folder in the first sub-area, the first part of the first display interface may be zoomed in according to the predetermined scale, and the icons and the folder(s) in the first part may be included. For example, when the user clicks or double clicks the first folder in the first display area of the electronic device, the first part of the display interface may be zoomed in based on the first sub-area in which the first folder is located, and accordingly the first sub-area in which the first folder is located is also zoomed in until reaching the full screen. If the first folder contains an icon, a zoomed-in icon may be displayed in the display area. As such, it is easy for the user to operate on the icon or the first folder. Also, the display effect of the display area appears more concise, improving the display effect of the electronic device and the user experience.

It may be well understood by the skilled in the art that division of various functional modules as described above is illustrated only as an example for convenience and conciseness of the description. In practical applications, the above functional allocation may be implemented by different functional modules as needed, i.e., the internal structure of the apparatus may be divided into different functional modules so as to implement all or part of functions as described above. Particular working procedures of the system, the apparatus and the unit as described above may refer to the corresponding process in the method embodiment. The description thereof will be omitted here.

It can be appreciated from the embodiments of the present application that the disclosed device and method can be implemented in alternative ways. The device embodiments as described above are illustrative only. For example, while the units have been divided in accordance with their logical functions, other divisions are possible in practice. For example, more than one unit or element can be combined or can be integrated into another system, or some features can be ignored or omitted. In addition, the coupling, direct coupling or communicative connection between various components as shown or discussed can be an indirect coupling or communicative connection via some interface, device or unit and can be electrical, mechanical or in another form.

The units described above as separated may or may not be physically separated. Some of the components shown as units may or may not be physical units. They can be co-located or can be distributed over a number of network elements. Depending on actual requirements, some or all of the units can be selected to achieve the object of the present disclosure.

Further, all the functional units in various embodiments of the present disclosure can be integrated within one processing unit, or each of these units can be a separate unit, or two or more units can be integrated into one unit. Such integrated unit can be implemented in hardware, possibly in combination with software functional units.

When the integrated units are implemented in software functional modules and sold or used as an independent product, they can be stored in a computer readable storage medium. In view of this, the technical solutions according to the embodiments of the present application, or in other words a part thereof which makes contribution over the existing technique, can be substantially embodied in a form of software product. The computer software product can be stored in a storage media, such as a U disc, a portable hard disc, a read-only memory (ROM), a random access memory (RAM), a magnetic disc or an optical disc and the like, containing instructions which cause a computer device (which can be a personal computer, a server, a network device or the like) to perform all or part of steps of the methods according to various embodiments of the present application.

While the embodiments of the present disclosure have been described above, the scope of the present disclosure is not limited thereto. Various modifications and alternatives can be made by those skilled in the art without departing from the scope of the present disclosure. These modifications and alternatives are to be encompassed by the scope of the present disclosure which is only defined by the claims as attached.

The invention claimed is:

1. An information processing method applied to an electronic device, the electronic device comprising a display unit and a sensing unit and having a display interface in which a background image and M icons and N folders located on the background image are included the method comprising:

displaying a first part of the display interface in a display area on the display unit, the first part of the display interface including a first part of the background image and P icons and Q folders located on the first part of the background image, where P≥0, Q≥1;

obtaining, by the sensing unit, a first manipulation operation on a first folder of the Q folders, wherein a first sub-area of the display interface containing the first folder occupies a first display area of the display area on the display unit, and wherein the first folder comprises K icons, an icon of the first folder is consisted of L icon logos, and the L icon logos are L icons with a zoom-out effect, where L≤K, and wherein the first sub-area includes a portion of the background image and the L icon logos;

executing a zoom-in instruction on the entire first part of the display interface according to a predetermined scale based on the location of the first folder, in response to the first manipulation operation;

displaying the first sub-area of the display interface in a second display area of the display area on the display unit when ending the zoom-in instruction executed on the first part of the display interface, wherein the second display area is larger than the first display area, and wherein a display effect of the first sub-area being located on the second display area is a zoom-in effect of the first sub-area being located on the first display area, and wherein the icons logos together with the portion of the background image in the first folder are enlarged in the second display area; and enabling an invoking function of the K icons when a zoomed-in icon of the first folder is displayed in the second display area of the display area on the display unit, so that each of the K icons can enable a corresponding application in response to a trigger operation.

2. The method according to claim 1, wherein ending the zoom-in instruction executed on the first part of the display interface comprises:

judging whether an execution result of the zoom-in instruction satisfies a predetermined condition; and ending the zoom-in instruction executed on the display interface, when the execution result satisfies the predetermined condition.

3. The method according to claim 1, wherein judging whether an execution result of the zoom-in instruction satisfies a predetermined condition particularly comprises:

determining whether a size of L icon logos is identical with that of the M icons of the display interface before the zoom-in instruction is executed on the display interface, wherein it is determined that the execution result satisfies the predetermined condition when the size of the L icon logos is identical with that of the M icons of the display interface before the zoom-in instruction is executed on the display interface; or determining whether a size of the first sub-area including the first folder on the display interface and a size of the display area satisfy a predetermined sub-condition, wherein it is determined that the execution result satisfies the predetermined condition, when the size of the first sub-area including the first folder on the display interface and the size of the display area satisfy the predetermined sub-condition.

4. The method according to claim 1, wherein when ending the zoom-in instruction executed on the first part of the display interface, the method further comprises:

obtaining, by the sensing unit, a second manipulation operation on the first folder displayed in the second display area;

executing a zoom-out instruction on the first part of the display interface according to the predetermined scale based on the location of the first folder, in response to the second manipulation operation; and displaying the first sub-area of the display interface in a third display area of the display area on the display unit, when ending the zoom-out instruction executed on the first part of the display interface, wherein the third display area is smaller than the second display area, and wherein a display effect of the first sub-area being located on the third display area is a zoom-out effect of the first sub-area being located on the second display area.

5. The method according to claim 4, wherein the second manipulation operation is particularly an operation of dragging a first icon, in the first sub-area of the K icons out of the first sub-area.

6. The method according to claim 5, wherein dragging the first icon out of the first sub-area particularly comprises:

generating an area frame in the first sub-area when it is determined by the sensing unit that there is the second manipulation operation on the first folder in the first sub-area, wherein the K icons are located in the area frame;

zooming out the first part of the display interface according to the predetermined scale and keeping the size of the first icon when the first icon is dragged; and displaying the first sub-area of the first display interface in the third display area of the display area on the display unit when the first icon is dragged out of the area frame, the first icon being located out of the first folder.

7. The method according to claim 4, wherein when ending the zoom-out instruction executed on the first part of the display interface, the method further comprises:

disabling the invoking function of the K icons, so that each of the K icons cannot enable a corresponding application in response to a trigger operation; wherein an icon of the first folder is consisted of L icon logos, the L icon logos are L icons with a zoom-out effect, where L≤K.

8. An information processing method applied to an electronic device, the electronic device comprising a display unit and a hardware sensing unit; the electronic device having a display interface, in which a background image and M icons and N folders located on the background image are included, the method comprising:

displaying a first part of the display interface in a display area on the display unit, the first part of the display interface including a first part of the background image and P icons and Q folders located on the first part of the background image, where P≥0, Q≥1;

obtaining, by the sensing unit, a first manipulation operation on a first folder of the Q folders, wherein a first sub-area of the display interface containing the first folder occupies a first display area of the display area on the display unit, and wherein the first folder comprises K icons, an icon of the first folder is consisted of L icon logos, and the L icon logos are L icons with a zoom-out effect, where L≤K, and wherein the first sub-area includes a portion of the background image and the L icon logos;

responding to the first manipulation operation;
displaying the first sub-area of the display interface in a second display area of the display area on the display unit,
wherein the second display area is larger than the first display area, and
wherein a display effect of the first sub-area being located on the second display area is a zoom-in effect of the first sub-area being located on the first display area, and wherein the icons logos together with the portion of the background image in the first folder are enlarged in the second display area; and
enabling an invoking function of the K icons when a zoomed-in icon of the first folder is displayed in the second display area of the display area on the display unit, so that each of the K icons can enable a corresponding application in response to a trigger operation.

9. The method according to claim 8, further comprising:
obtaining, by the sensing unit, a second manipulation operation on the first folder displayed in the second display area;
responding to the second manipulation operation; and
displaying the first sub-area of the display interface in a third display area of the display area on the display unit, wherein the third display area is smaller than the second display area, and wherein a display effect of the first sub-area being located on the third display area is a zoom-out effect of the first sub-area being located on the second display area.

10. The method according to claim 9, further comprising:
displaying a smooth zoom-in process in the display area on the display unit during the first part of the display interface is zoomed in; and/or
displaying a smooth zoom-out process in the display area on the display unit during the first part of the display interface is zoomed out.

11. An electronic device, comprising a processor, a storage media containing instructions, a display unit and a sensing unit and having a display interface in which a background image and M icons and N folders located on the background image are included, wherein the instructions when executed by the processor causing the processor to perform the following steps:
displaying a first part of the display interface in a display area on the display unit, the first part of the display interface including a first part of the background image and P icons and Q folders located on the first part of the background image, where P≥0, Q≥1;
obtaining, by the sensing unit, a first manipulation operation on a first folder of the Q folders, wherein a first sub-area of the display interface containing the first folder occupies a first display area of the display area on the display unit, wherein the first folder comprises K icons, an icon of the first folder is consisted of L icon logos, and the L icon logos are L icons with a zoom-out effect, where L≤K, and wherein the first sub-area includes a portion of the background image and the L icon logos;
executing a zoom-in instruction on the entire first part of the display interface according to a predetermined scale based on the location of the first folder in response to the first manipulation operation; and
displaying the first sub-area of the display interface in a second display area of the display area on the display unit when ending the zoom-in instruction executed on the first part of the display interface,
wherein the second display area is larger than the first display area, and
wherein a display effect of the first sub-area being located on the second display area is a zoom-in effect of the first sub-area being located on the first display area, and wherein the icon logos together with the portion of the background image in the first folder are enlarged within the second display area; and
enabling an invoking function of the K icons when a zoomed-in icon of the first folder is displayed in the second display area of the display area on the display unit, so that each of the K icons can enable a corresponding application in response to a trigger operation.

12. The electronic device according to claim 11, wherein the processor is further caused to:
judging whether an execution result of the zoom-in instruction satisfies a predetermined condition; and
ending the zoom-in instruction executed on the display interface, when the execution result satisfies the predetermined condition.

13. The electronic device according to claim 12, wherein the processor is further caused to:
determining whether a size of L icon logos is identical with that of the M icons of the display interface before the zoom-in instruction is executed on the display interface, wherein it is determined that the execution result satisfies the predetermined condition when the size of the L icon logos is identical with that of the M icons of the display interface before the zoom-in instruction is executed on the display interface; or
determining whether a size of the first sub-area including the first folder on the display interface and a size of the display area satisfy a predetermined sub-condition, wherein it is determined that the execution result satisfies the predetermined condition when the size of the first sub-area including the first folder on the display interface and the size of the display area satisfy the predetermined sub-condition.

14. The electronic device according to claim 11, wherein the processor is further caused to:
obtaining, by the sensing unit, a second manipulation operation on the first folder displayed in the second display area;
executing a zoom-out instruction on the first part of the display interface according to the predetermined scale based on the location of the first folder in response to the second manipulation operation; and
displaying the first sub-area of the display interface in a third display area of the display area on the display unit when ending the zoom-out instruction executed on the first part of the display interface, wherein the third display area is smaller than the second display area, and wherein a display effect of the first sub-area being located on the third display area is a zoom-out effect of the first sub-area being located on the second display area.

15. The electronic device according to claim 14, wherein the second manipulation operation is particularly an operation of dragging a first icon, in the first sub-area, of the K icons out of the first sub-area.

16. The electronic device according to claim 15, wherein the processor is further caused to:
generating an area frame in the first sub-area, when it is determined by the sensing unit that there is the second manipulation operation on the first folder in the first sub-area, wherein the K icons are located in the area frame;

zooming out the first part of the display interface according to the predetermined scale and keeping the size of the first icon when the first icon is dragged; and displaying the first sub-area of the first display interface in the third display area of the display area on the display unit when the first icon is dragged out of the area frame, wherein the first icon is located out of the first folder.

17. The electronic device according to claim 14, wherein the processor is further caused to:

disabling the invoking function of the K icons, so that each of the K icons cannot enable a corresponding application in response to a trigger operation, wherein an icon of the first folder is consisted of L icon logos, and the L icon logos are L icons with a zoom-out effect, where $L \leq K$.

* * * * *